United States Patent [19]

Gose et al.

[11] Patent Number: 4,740,885

[45] Date of Patent: Apr. 26, 1988

[54] METHOD FOR MONITORING THE TRACK GENERATED BY THE CONTROL OF THE DRIVES OF COMPUTER CONTROLLED MACHINE TOOL OR AN INDUSTRIAL ROBOT

[75] Inventors: Horst Gose; Wolfgang Papiernik, both of Erlangen, Fed. Rep. of Germany

[73] Assignee: Siemens Aktiengesellschaft, Munich, Fed. Rep. of Germany

[21] Appl. No.: 24,883

[22] Filed: Mar. 11, 1987

Related U.S. Application Data

[63] Continuation of Ser. No. 708,442, Mar. 5, 1985, abandoned.

[30] Foreign Application Priority Data

Mar. 8, 1984 [DE] Fed. Rep. of Germany ....... 3408523

[51] Int. Cl.$^4$ ...................... G05B 17/02; G05B 19/18
[52] U.S. Cl. .................................... 364/149; 318/561; 364/165; 364/474; 364/513

[58] Field of Search ........ 364/513, 474, 475, 148–151, 364/164, 165, 176, 177, 553; 318/561, 563, 565, 632

[56] References Cited

U.S. PATENT DOCUMENTS

| | | | |
|---|---|---|---|
| 3,225,179 | 12/1965 | Chestnut et al. | 364/149 X |
| 3,230,351 | 1/1966 | Platt et al. | 364/150 |
| 4,130,787 | 12/1978 | Allaire et al. | 318/565 |
| 4,213,175 | 7/1980 | Kurihara | 364/150 X |
| 4,214,301 | 7/1980 | Kurihara et al. | 364/150 X |
| 4,358,822 | 11/1982 | Sanchez | 364/151 |
| 4,502,109 | 2/1985 | Delmege et al. | 364/149 X |
| 4,509,110 | 4/1985 | Levesque, Jr. et al. | 364/150 X |

Primary Examiner—Joseph F. Ruggiero
Attorney, Agent, or Firm—Kenyon & Kenyon

[57] ABSTRACT

In a computer controlled machine tool, the actual tracks obtained from the reference values are simulated by means of system models of the drive circuits for reducing contour errors, and an excessive deviation between the reference and the actual track is used for changing the operating track velocity.

1 Claim, 1 Drawing Sheet

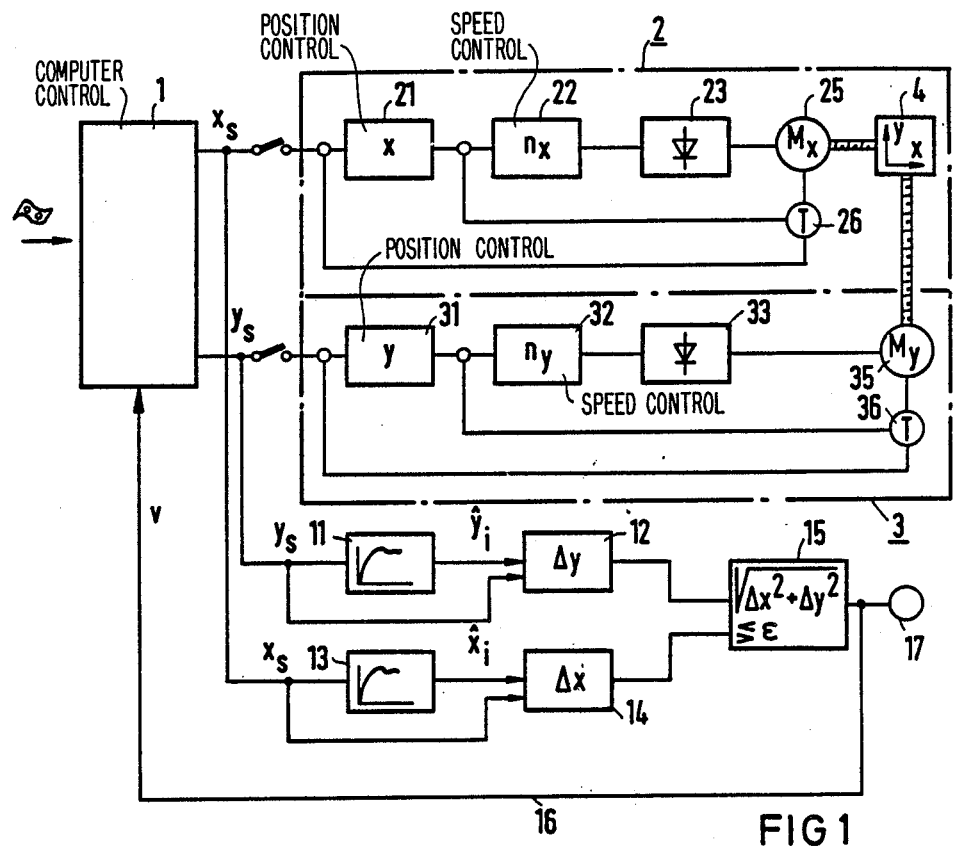
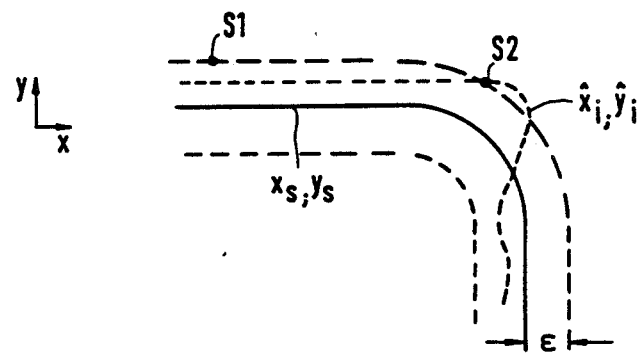

METHOD FOR MONITORING THE TRACK GENERATED BY THE CONTROL OF THE DRIVES OF COMPUTER CONTROLLED MACHINE TOOL OR AN INDUSTRIAL ROBOT

This is a continuation of co-pending application Ser. No. 708,442 filed on Mar. 5, 1985 now abandoned.

BACKGROUND OF THE INVENTION

This invention relates to a method for monitoring the track generated by the control of the drives of a computer controlled machine tool or an industrial robot, in general, and more particularly, to a method for comparing reference values stored in a user program with the corresponding actual values of the track travel distance for undue deviations.

Computer controlled machine tools are well known (see, for instance, DE-AS No. 27 29 372), in which, for monitoring the drives and therefore, also the contour traveled, the drag distance, i.e., the deviation between a distance reference value and the actual distance value is checked and a trouble signal is given in the event of unpermissible deviations. In such controls, it is also known to form the ratio of the cyclically determined partial-distance, actual values and the corresponding speed reference values, and also to use a deviation from a given ratio as an indication of trouble.

It is an object of the present invention to provide a simple monitoring system, with which it is possible to check whether the desired track stored in the user program can be maintained with predetermined velocities and operating conditions.

SUMMARY OF THE INVENTION

According to the present invention, this problem is solved by the following features:

1. A discrete system model of each drive section is stored in the computer.
2. Prior to traversing the track or a part thereof in accordance with the reference values stored in the user program, the corresponding actual values are calculated at discrete times with the aid of the system model, for a given track velocity.
3. A trouble signal is generated in the event of unpermissible deviations of the reference value from the determined corresponding actual values.

In this manner, the NC (numerical control) user program can be simulated in advance by means of the discrete system model as a whole, or also in part, faster than in real time while the user program is running.

Thereby, an expected track error (contour error) can be predicted and, as the case may be, influence can be exerted on the user program, i.e., in the present case, the track velocity.

For one, a given machining accuracy can be maintained in this manner. However, machining which is optimum in time can also be achieved if the one given accuracy limit is utilized.

As already noted, the system model is stored in the computer as a difference equation, where the model order can be adapted to the desired model accuracy. In systems with constant parameters, such as machine tools, the difference equation can be determined, for one, in the starting-up phase (for instance, by the method of least squares). If the system contains time-variable parameters, such as for instance, in robots, the unloading of the load, the model can be corrected continuously by an operational identification procedure.

BRIEF DESCRIPTION OF THE DRAWINGS

FIG. 1 is a block diagram of a contour monitoring device according to the present invention.

FIG. 2 shows the geometric relationships involved with the device of FIG. 1.

DETAILED DESCRIPTION

A known computer control 1 provides into reference-value channels, distance reference values $x_s$, $y_s$ in the x-and-y direction, which correspond to the distance reference values stored in the user program. The rate change of the distance input is a measure of the track velocity with which the track is to be transversed. These reference values arrive at the distance control system 2 indicated by the dashed frame for the x axis and the distance control system 3 for the y axis which is likewise indicated by the dashed frame. The distance control system 2 which is shown simplified, consists of a position control 21, a speed control 22, a thyristor control member 23 and a d-c servo motor 25 which drives the x feed shaft of the schematically shown machine tool. The same applies to the distance control system 3 in the y axis with the distance control 31, the speed control 32, a thyristor control member 33, and the motor 35 for movement in the y axis of the machine 4. For acknowledging the speed of rotation and the actual distance value, pulse generators 26 and 36, respectively, are used.

The control described up to now corresponds to already known controls. It should be noted here that only for the sake of clarity, parts of the system, such as the position control, are shown by separate functional modules; in reality, they may optionally also be integrated into the computer control 1, like the speed controller.

Additionally, a model 11 and 13, respectively, of the system in question is stored in the computer control for each system 2 and 3, respectively. This system model stored in the form of a difference equation takes into consideration the electrical equivalent time constants and the mechanical inertia of the system and permits calculation of the actual value expected, starting out from the reference value on the input side. As indicated, such models 11 and 13 are provided for the system 2 as well as for the system 3. The actual values $\hat{x}_i$ and $\hat{y}_i$ are each further compared with the respective reference values in the comparator 14. The deviations determined in the comparators 12 and 14 are geometrically added in the stage 15. If they exceed a given magnitude $\epsilon$, a trouble signal is given, as indicated by the indicator 17.

The essential advantage of the system model used here is seen in the fact that a test run can be simulated even before the start of machining by means of the user program stored in the computer control 1 and it can be determined each time when, for a given track velocity, a given deviation from the reference track determined by $x_s$ and $y_s$ appears (see FIG. 2). If such a deviation occurs, for instance, point S2 in FIG. 2, the location at which the deviation from the contour was excessive is stored, and, as indicated by the line 16, a corresponding signal is given to the computer control which causes the feed velocity v, i.e., the track velocity, to be reduced when approaching this point S2 in real operation.

Instead of simulating the overall program, appropriate checks can also be made by means of the system model before the next machining set is executed, and the track velocity can be corrected accordingly.

The above-described method can be used not only for obtaining the highest possible track accuracy but also to achieve optimum machining in time if a certain contour error is allowed. For instance, it would be possible without problems, if the contour error $\epsilon$ is allowed, to increase the track velocity at the point S1 without the danger that excessive deviations could occur. Also, these values can be stored and taken into consideration in the machining itself.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. In a computer-controlled machine tool or industrial robot having first and second drives for movement along a track plottable in a Cartesian coordinate system defined by two axes, first and second controllers for controlling said first and second drives, respectively, in response to first and second corresponding reference values generated by a system program according to a predetermined track velocity, a method of controlling said drives comprising the steps of:

A. supplying said first and second reference values to a respective first and second system model to obtain corresponding first and second predicted position values indicative of the actual track of the drives;
   B. comparing said first and second predicted position values, respectively, to said first and second reference values;
   C. generating first and second position error signals corresponding to the differences of said firts reference value and first predicted position value, and second reference value and second predicted position value, respectively;
   D. taking the square root of the sum of the squares of said position error signals to form a square root error signal;
   E. comparing said square root error signal to a threshold value;
   F. reducing said first and second reference values by predetermined amounts if said square root error signal exceeds said threshold; and
   G. supplying said reference value to said controllers when the corresponding squrae root error signal is below said threshold value.

* * * * *